United States Patent
Kafai et al.

(10) Patent No.: US 10,579,623 B2
(45) Date of Patent: Mar. 3, 2020

(54) UPDATING DATA MODELS FOR STREAMING DATA

(71) Applicant: HEWLETT PACKARD ENTERPRISE DEVELOPMENT LP, Houston, TX (US)

(72) Inventors: Mehran Kafai, Palo Alto, CA (US); Hongwei Shang, Palo Alto, CA (US); Omar Aguilar Macedo, Tlaquepaque (MX)

(73) Assignee: Hewlett Packard Enterprise Development LP, Houston, TX (US)

( * ) Notice: Subject to any disclaimer, the term of this patent is extended or adjusted under 35 U.S.C. 154(b) by 865 days.

(21) Appl. No.: 15/143,138

(22) Filed: Apr. 29, 2016

(65) Prior Publication Data
US 2017/0316341 A1    Nov. 2, 2017

(51) Int. Cl.
*G06F 16/2455* (2019.01)
*G06N 7/00* (2006.01)

(52) U.S. Cl.
CPC ....... *G06F 16/24568* (2019.01); *G06N 7/005* (2013.01)

(58) Field of Classification Search
None
See application file for complete search history.

(56) References Cited

U.S. PATENT DOCUMENTS

| | | |
|---|---|---|
| 8,250,003 B2 | 8/2012 | Candela et al. |
| 8,782,683 B2 | 7/2014 | Balakrishnan et al. |
| 2015/0167999 A1* | 6/2015 | Seem .............. F24F 11/30 700/276 |

OTHER PUBLICATIONS

Zliobaite et al., Optimizing regression models for data streams with missing values, Mach Learn, 2015, vol. 99, pp. 47-73 (Year: 2015).*
"Ridge Regression"; Mar. 27, 2014; 6 pages; printed from: http://academic.macewan.ca/burok/Stat378/notes/ridge.pdf.
Ikonomovska, E., et al.; "Learning model trees from evolving data streams"; Jan. 27, 2010; 41 pages. http://www.liaad.up.pt/kdus/downloads/publications/dami10.pdf.
Madakyaru, M., et al.; "Linear Inferential Modeling: Theoretical Perspectives, Extensions, and Comparative Analysis"; Jul. 26, 2012; 14 pages. http://dx.doi.org/10.4236/ica.2012.34042.
Nykodym, T., et al.: "Generalized Linear Modeling with H2O"; Aug. 2015; 33 pages. https://h2o-release.s3.amazonaws.com/h2o/rel-slater/9/docs-website/h2o-docs/booklets/GLM_Vignette.pdf.
Schifano et al., "Online Updating of Statistical Inference in the Big Data Setting", arXiv preprint, 2015, 43 pages.

* cited by examiner

*Primary Examiner* — Alan Chen
(74) *Attorney, Agent, or Firm* — Mannava & Kang, P.C.

(57) ABSTRACT

Dynamically updating a ridge regression data model of a continuous stream of data is disclosed. New data chunks corresponding to a current data accumulation point are received and the data values in the new data chunks are transformed via standardization methods. A ridge estimator for the standardized data that includes data chunks received up to a penultimate data accumulation point to include the new data chunks is dynamically updated. The cumulative observations received up to the current data accumulation point are updated and stored. Predictions for the continuous data stream are generated based on the updated ridge estimator.

18 Claims, 4 Drawing Sheets

UPDATING DATA MODELS FOR STREAMING DATA

BACKGROUND

The advent of the Internet and sophisticated electronic equipment infused the modern world with innumerable data sources which are interconnected. These data sources can emit data of various formats at different frequencies. Certain data sources produce discontinuous data at different time intervals that may be periodic or non-periodic. Other data sources produce data continuously as a data stream. Data stores of high storage capacity are used to save large volumes of data or 'Big Data' so that the data can be mined to identify trends. Various statistical data models are constructed based on the data to study the trends.

BRIEF DESCRIPTION OF THE DRAWINGS

Features of the present disclosure are illustrated by way of example and not limited in the following figure(s), in which like numerals indicate like elements, and in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Hardware such as electric machinery used in homes and factories is constantly working and its monitoring equipment may be continuously producing data. For example, monitoring equipment associated with electric motors generates large volumes of data. A power company which supplies power to domestic and commercial establishments can collect the data generated by the monitoring equipment such as electric meters to study trends and gain insights into the power usage. This enables the power company to operate more efficiently, for example, by adjusting their production capacities based on the detected trends. Similarly, various uses exist in the real-world for the application of statistical data models that are employed to study trends and make predictions that have real-world impact.

In the power company example discussed above, data is produced continuously by the monitoring equipment as a data stream and such data streams from a plurality of sources such as the power meters in the various establishments may be monitored to detect power consumption patterns. The patterns can be modeled via statistical methodologies and as new data arrives, the statistical models need to be updated to accommodate the new data. Data models such as those based on ridge regression methodologies are used when the data is static data where no new data needs to be accommodated by the model. However, such methods tend to be computationally inefficient when applied to dynamic, streaming data where new data is constantly received. This is because, as new data arrives within short time periods, for example, every second, it necessitates rebuilding the entire model.

Figure 1:
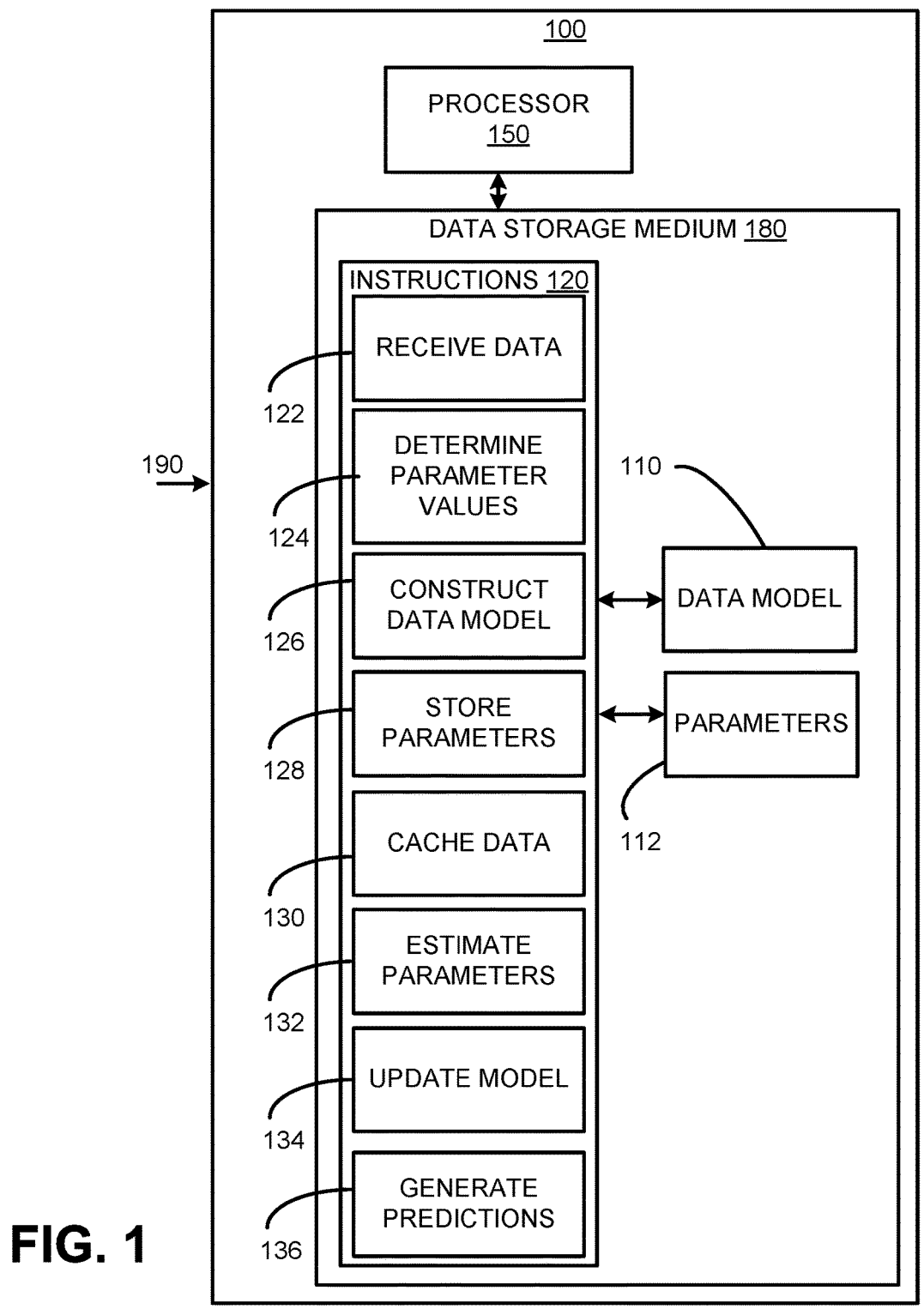
FIG. 1 is a block diagram of a computing apparatus for updating a ridge regression data model, according to an example of the present disclosure.

Examples described below may include computationally efficient methods for updating data models that accommodate streaming data and which are based on ridge regression methodologies. FIG. 1 is a block diagram of a computing apparatus 100 for constructing and updating a ridge regression data model 110. The computing apparatus 100 includes a processor 150 and a non-transitory data storage medium 180 that comprises processor-executable instructions 120 for carrying out tasks related to building and online updating of the data model 110 which may be stored in a remote data storage medium or in the local storage medium 180. When executed by the processor 150, the instructions to receive data 122 enable the processor 150 to receive continuously streamed data 190 from various data sources. In the example discussed above, the streamed data 190 can comprise data values which include observables and response variables. The streamed data 190 may be obtained from data sources such as the power monitoring instruments located in the various establishments. The streaming data 190 may be received from the same population having the same underlying distribution.

In order to construct the model 110, the parameters 112 of the model 110 are identified and their values are determined by the processor 150 based on the accumulated data values via execution of the instructions 124. The parameters 112 together with the received data values, including the observations and response variables, may be used to construct the model 110 by the processor 150 via execution of the instructions 126. In an example, the model 110 may be constructed based on the data values received up to a penultimate data accumulation point which immediately precedes a current data accumulation point. As the data values are constantly streamed to the computing apparatus 100, data accumulation points are time points which may be set periodically or at particular time intervals to update the model 110. When a data accumulation time point occurs, the model 110 is updated to include the data values received during the time intervals up to that data accumulation point. For example, if the current data accumulation point corresponds to the tenth second, the model 110 constructed by the instructions 126 may be based on the data values received up to the ninth second. The processor 150 further executes instructions to store 128 the model 110 and to save the values of the parameters 112.

The data which is constantly arriving at the computing apparatus 100 may be accumulated periodically, for example, at every second. Accordingly, the data accumulation points are set periodically at every second. As the model 110 represents streaming data, the parameters 112 and hence the model 110 need to be periodically determined (e.g., every second) in order to accommodate new data values that are continuously received by the computing apparatus 100.

However, constructing a new data model at every period may be inefficient in terms of time and computing resources. Hence, the model 110 may be configured to be dynamically updatable in a manner that minimizes the time needed for updating while making optimum use of the computational resources since new data is almost continuously streamed to the computing apparatus 100.

In an example, the processor 150 executes instructions to cache 130 or store the new data values for up to a certain time interval after the data accumulation point at which the model 110 was constructed. In an example, the time interval can correspond to the time between the penultimate data accumulation point and the current data accumulation point. Upon the expiry of the time interval, the processor 150 executes instructions 132 to estimate the parameters with the new data values which were cached. In an example, the parameters may be re-calculated to include the cached data values. The model 110 is updated by the processor 150 by executing the instructions 134. The model update may be based on the estimated parameters, the cached data values and the values of the parameters 112 that were earlier stored by the processor 150 via execution of the instructions 128. When contrasted with the procedures of rebuilding the model 110 at every data accumulation point, updating previously determined parameters based on the new data is a faster procedure which also consumes less computing resources. The speed of calculation and the optimization of computing resource usage can be advantageous when updating dynamic data models such as the model 110 online in real-time as new data is continuously received even as the model 110 is being updated.

The updated model 110, which includes the updated values of the parameters, is used to generate predictions via execution of the instructions 136 by the processor 150. It may be noted that the same model 110 is updated with the new data values received up to the current data accumulation point. Referring again to the above example regarding power consumption, the model 110 which is updated with the latest data values obtained up to the current data accumulation point, can be used to make predictions regarding power usage by the consumers. In an example, the predictions may be used to adjust certain values or other information displayed to the users on a user interface.

In accordance with one example, the computing apparatus 100 receives a stream of data from a single data source or a plurality of data sources. In either case, the data comes from the same population following the same underlying distribution. Let $(y_i, x_i)$, $i=1, 2, \ldots N$ be N independent observations so that their linear relationship can be expressed via a linear regression model:

$$y_i = x_i'\beta + \epsilon_i \quad \text{Eq. (1)}$$

In Eq. (1), $x_i'\beta$ is the inner product between a p-dimensional vector $x_i$ and a parameter vector $\beta$, $\epsilon_i$ is the error term with $\epsilon_i \sim N(0, \sigma^2)$ independently for $i=1, 2, \ldots N$. Here, "'" represents transpose so $x_i'$ is the transpose of x. Also, $x_i'$ can be represented as X, so Eq. (1) can also be rewritten as $y=X\beta+\epsilon$. So, for $i=1, 2, \ldots N$, $y=(y_1, y_2, \ldots, y_N)'$ and $X=(x_1, x_2, \ldots, x_N)'$ where y is the response variable vector and X is the design matrix. In an example, the N observations arrive in chunks from a data stream and at each data accumulation point k, an $n_k$-dimensional response variable vector $y_k$ is observed along with an $n_k \times p$ design matrix $X_k$ for $k=1, 2, \ldots K$. Then $y=(y_1', y_2', \ldots, y_K')'$ and $X=(X_1', X_2', \ldots, X_K')'$.

A model for the data stream described above is constructed using the ridge regression methodology. Given the shrinkage parameter $\lambda$, the ridge estimator $\hat{\beta}$ for static data can be expressed as shown below:

$$\hat{\beta} = (X'X + \lambda I)^{-1} X'y \quad \text{Eq. (2)}$$

In Eq. (2), X represents the $n_k \times p$ design matrix, X' represents the transpose of the design matrix X, y represents the $n_k$-dimensional response variable vector, and I is a $p \times p$ identity matrix. For a dynamic data stream as described above, where new data values y and X are continuously received, the equation for a model parameter namely, the ridge estimator $\hat{\beta}$ can be expressed as shown below where $\hat{\beta}$ is expressed as a summation over periodic time intervals each of which represents a data accumulation point. The value of $\hat{\beta}$ at the Kth data accumulation point or the current data accumulation point can be expressed as:

$$\hat{\beta} = \left(\sum_{k=1}^{K} X_k'X_k + \lambda I\right)^{-1} \left(\sum_{k=1}^{K} X_k'y_k\right) \quad \text{Eq. (3)}$$

Let $\hat{\beta}_K$ denote the ridge estimator for the cumulative data $D_k=(y_l, X_l)$, $l=1, 2, \ldots, k$, so that when updated online in real-time as further data is received at the computing apparatus 100, the ridge estimator $\hat{\beta}_k$ for the cumulative data $D_k$ can take the form:

$$\hat{\beta}_k = (V_{k-1} + X_k'X_k + \lambda I)^{-1} \left(\sum_{l=1}^{k-1} X_l'y_l + X_k'y_k\right), \quad \text{Eq. (4)}$$

where the cumulative observations $V_k$ for a time point k, is $$V_k = \sum_{k=1}^{K} X_k'X_k \quad \text{Eq. (20)}$$

Thus, the ridge estimator for the Kth data accumulation time point is obtained from a Bayesian perspective that uses the previous (K−1) subsets of data as prior data for the current data at point K.

Accordingly, the model 110 is constructed at data accumulation point (K−1) and subsequent data values may be cached until a next data accumulation point K. At a current data accumulation point K, the model 110 which was constructed with the data received until a penultimate data accumulation point (K−1) is retrieved and updated with cumulative observations $V_k$ which covers the data values obtained in the time interval between the current data accumulation point K and the penultimate data accumulation point (K−1). The value of $V_k$ when combined with the model 110 for the (K−1) data accumulation point as shown in Eq. (4), mitigates the need to re-compute the model 110 at the Kth data accumulation point to include the data values received by the computing apparatus 100 in the time period between the consecutive data accumulation points (K−1) and K. Via application of the model 110 obtained at the penultimate data accumulation point as a prior to the computation at the current data accumulation point, time and computing resources are optimized when computing data models for streaming data.

The parameters of the model 110 are updated in response to the observations received during the time interval between the data accumulation points (K−1) and K. In Eq. (4) $\lambda$ is the shrinkage parameter which needs to be optimized to compensate for the scale of the variable x. Hence, correlation transformation is used which is a modification of the standardization techniques normally applied to a variable. The standardization includes subtracting the mean of all observations for the variable and dividing by the standard deviation of the observations for the variable. Thus, the usual standardizations of $y_i$ and $x_{i,j}$, $j=1, 2, 3, \ldots, p$ are shown below:

$$\tilde{y}_i = \frac{y_i - \bar{y}}{s_y}, \quad \text{Eq. (5)}$$

$$\tilde{x}_{i,j} = \frac{x_{i,j} - \bar{x}_j}{s_j}, \, j = 1, 2, \ldots, p \quad \text{Eq. (6)}$$

In Eq. (6), $\bar{y}$ and $\bar{x}_j$ are the respective means of the y and $x_j$ observations and $s_y$ and $s_j$ are the respective standard deviations. The correlation transformation is a function of the standardized variables:

$$y_i^* = \frac{1}{\sqrt{n-1}} \left( \frac{y_i - \bar{y}}{s_y} \right) = \frac{1}{\sqrt{n-1}} \tilde{y}_i, \quad \text{Eq. (7)}$$

$$x_{i,j}^* = \frac{1}{\sqrt{n-1}} \left( \frac{x_{i,j} - \bar{x}_j}{s_j} \right) = \frac{1}{\sqrt{n-1}} \tilde{x}_{i,j}, \, j = 1, 2, \ldots, p \quad \text{Eq. (8)}$$

Note that there is no intercept parameter in the standardized regression model where variables are transformed by the correlation transformation. Similar to the Eq. (4), the standardized ridge regression estimator based on cumulative data $D_k$ (denoted by $\beta_k^*$) for the transformed ridge regression has the form:

$$\beta_k^* = (V_{k-1,k}^* + X_{k,k}^{*\prime} X_{k,k}^* + \lambda I)^{-1} \left( \sum_{l=1}^{k-1} X_{l,k}^{*\prime} y_{l,k}^* + X_{k,k}^{*\prime} y_{k,k}^* \right), \quad \text{Eq. (9)}$$

Where $X^*_{l,k}$ and $y^*_{l,k}$ ($l=1, 2, \ldots, k$) are transformed from $X_l$ and $y_l$ respectively via correlation transformation for the data chunks up to the current data accumulation point k where:

$$V_{m,k}^* = \sum_{l=1}^{m} X_{l,k}^{*\prime} X_{l,k}^*; \quad \text{Eq. (10)}$$

Let the no. of observations for each second be $n_l$, then the accumulated number of observations by point k is:

$$N_k = \sum_{l=1}^{k} n_l, \quad \text{Eq. (11)}$$

and $\tilde{X}_l$ and $\tilde{y}_l$ are the standardization of $X_l$ and $y_l$ respectively, then:

$$X_{l,k}^{*\prime} X_l^* = \frac{1}{N_k - 1} \tilde{X}_l^{\prime} \tilde{X}_l \quad \text{Eq. (12)}$$

$$X_{l,k}^{*\prime} X_{l,k}^* = \frac{1}{N_k - 1} \tilde{X}_l^{\prime} \tilde{y}_l, \, (l = 1, \ldots, k). \quad \text{Eq. (13)}$$

Using Eq. (9), the standardized ridge regression estimator at the penultimate data accumulation point (k−1) is:

$$\beta_{k-1}^* = (V_{k-1,k-1}^* + \lambda I)^{-1} \sum_{l=1}^{k-1} X_{l,k-1}^{*\prime} y_{l,k-1}^* \quad \text{Eq. (14)}$$

Rearranging the terms in the Eq. (14) results in:

$$\sum_{l=1}^{k-1} X_{l,k-1}^{*\prime} y_{l,k-1}^* = \left( \frac{1}{N_{k-1} - 1} \tilde{V}_{k-1} + \lambda I \right) \beta_{k-1}^* \quad \text{Eq. (15)}$$

Eq. (15) holds true for the data accumulation point (k−1) where $\tilde{V}_{k-1} = \sum_{l=1}^{k-1} \tilde{X}_l^{\prime} \tilde{X}_l$. Therefore, $\sum_{l=1}^{k-1} X_{l,k}^{*\prime} y_{l,k}^*$ can be expressed as:

$$\sum_{l=1}^{k-1} X_{l,k}^{*\prime} y_{l,k}^* = \frac{N_{k-1} - 1}{N_k - 1} \sum_{l=1}^{k-1} X_{l,k-1}^{*\prime} y_{l,k-1}^* \quad \text{Eq. (16)}$$

Which in turn can be expressed as shown below via substituting the R.H.S from Eq. (15) in Eq. (16):

$$\sum_{l=1}^{k-1} X_{l,k}^{*\prime} y_{l,k}^* = \frac{N_{k-1} - 1}{N_k - 1} \left( \frac{1}{N_{k-1} - 1} \tilde{V}_{k-1} + \lambda I \right) \beta_{k-1}^* \quad \text{Eq. (17)}$$

Multiplying the terms on the R.H.S., Eq. (17) is now:

$$\sum_{l=1}^{k-1} X_{l,k}^{*\prime} y_{l,k}^* = \left( \frac{1}{N_k - 1} \tilde{V}_{k-1} + \frac{N_{k-1} - 1}{N_k - 1} \lambda I \right) \beta_{k-1}^* \quad \text{Eq. (18)}$$

Thus, $\beta_k^*$ can now be solved as:

$$\beta_k^* = (\tilde{X}_k^{\prime} \tilde{X}_k + \tilde{V}_{k-1} + \lambda(N_k - 1))^{-1} (\tilde{X}_k^{\prime} \tilde{y}_k + \lambda(N_{k-1} - 1)I) \beta_{k-1}^*) \quad \text{Eq. (19)}$$

The above Eq. (19) provides the transformed ridge estimator for the $k^{th}$ data accumulation point $\beta_k^*$ in terms of the ridge estimator at the $(k-1)^{th}$ data accumulation point $\beta_{k-1}^*$.

The updated model as represented, for example, by Eq. (19) is used to generate the predictions for the continuous data stream. The model 110 is thus dynamic in that it responds to new observations as they are received by the computing apparatus 100. However, the model 110 is constructed from a Bayesian perspective so that it is updated in response to the new values that are received between the $(k-1)^{st}$ data accumulation point and the $k^{th}$ data accumulation point in a manner that is efficient in terms of time and computational resource usage.

Figure 2:
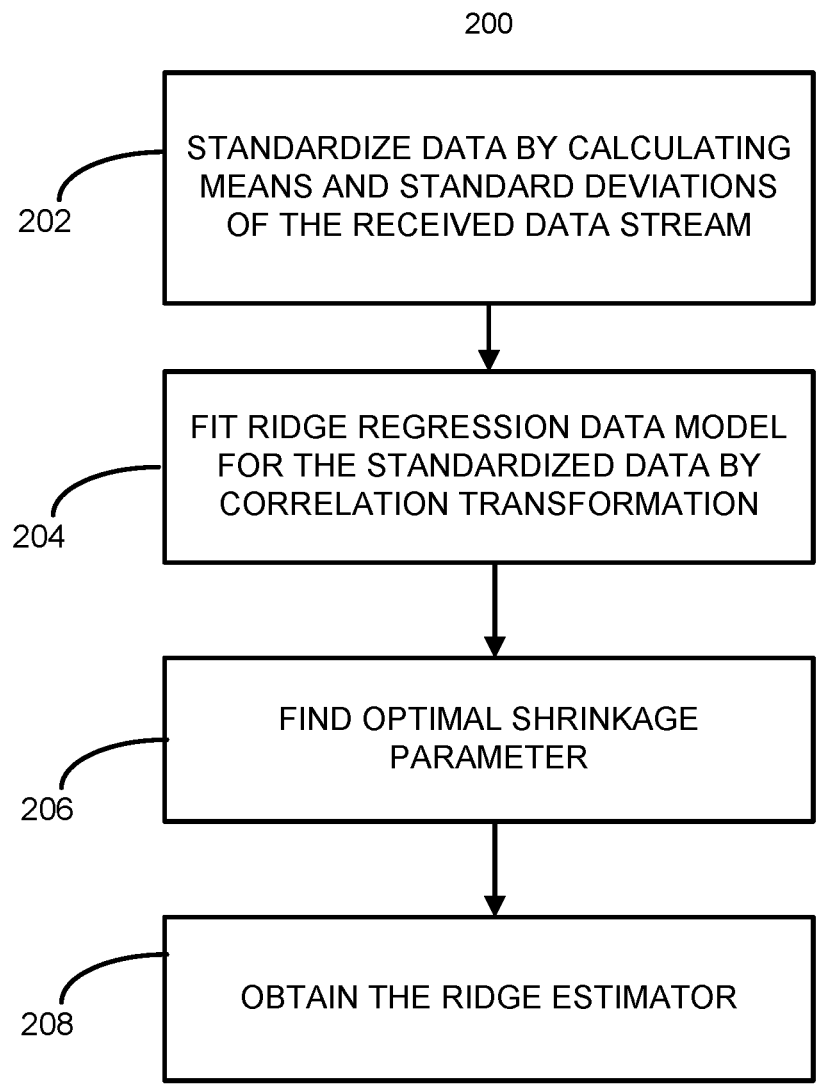
FIG. 2 is a flowchart of a method for online updating of a ridge regression data model for streaming data, according to an example of the present disclosure.

FIG. 2 is a flowchart 200 that details an example method for online updating of a ridge regression data model for streaming data. The method begins at 202 with standardizing the data by calculating the means $\bar{y}$, $\bar{x}_j$ and standard deviations $s_y$ and $s_j$ for the streaming data $(y_i, x_i)$, $i=1, 2, \ldots N$ having N independent observations. At 204, a ridge regression data model is fitted to the standardized data by correlation transformation. The correlation transformation is a function of the standardized variables obtained at 202 as shown at Eq. (7) and Eq. (8) reproduced below:

$$y_i^* = \frac{1}{\sqrt{n-1}} \left( \frac{y_i - \bar{y}}{s_y} \right) = \frac{1}{\sqrt{n-1}} \tilde{y}_i, \quad \text{Eq. (7)}$$

$$x_{i,j}^* = \frac{1}{\sqrt{n-1}} \left( \frac{x_{i,j} - \bar{x}_j}{s_j} \right) = \frac{1}{\sqrt{n-1}} \tilde{x}_{i,j}, \, j = 1, 2, \ldots, p \quad \text{Eq. (8)}$$

The standardized ridge regression estimator based on cumulative data $D_k$ received up to the current data accumulation point k for the transformed ridge regression has the form shown in Eq. (9):

$$\beta_k^* = (V_{k-1,k}^* + X_{k,k}^{*\prime} X_{k,k}^* + \lambda I)^{-1} \left( \sum_{l=1}^{k-1} X_{l,k}^{*\prime} y_{l,k}^* + X_{k,k}^{*\prime} y_{k,k}^* \right), \quad \text{Eq. (9)}$$

At 206, an optimal shrinkage parameter λ using model validation techniques such as cross validation. During cross validation, a sample of data is partitioned into complementary subsets and a subset is analyzed with a selected value of the shrinkage parameter λ. The analysis is validated on the other subset. Similarly, cross-validation is attempted multiple times using different complementary subsets and the validation results are averaged from the various attempts to identify an optimal value for the shrinkage parameter λ. It may be appreciated that near-optimal or optimal values are as understood within computing limits. At 208, the ridge estimator for the standardized data $\beta_k^*$ is obtained as shown below in Eq. (19).

$$\beta_k^* = (\tilde{X}_k'\tilde{X}_k + \tilde{V}_{k-1} + \lambda(N_k-1)I)^{-1}(\tilde{X}_k'\tilde{y}_k + (\tilde{V}_{k-1} + \lambda(N_{k-1}-1)I)\beta_{k-1}^*) \quad \text{Eq. (19)}$$

The streaming data is therefore modeled using ridge regression methodologies in a manner that is updatable in response to data which is continuously received by the computing apparatus 100.

Figure 3:
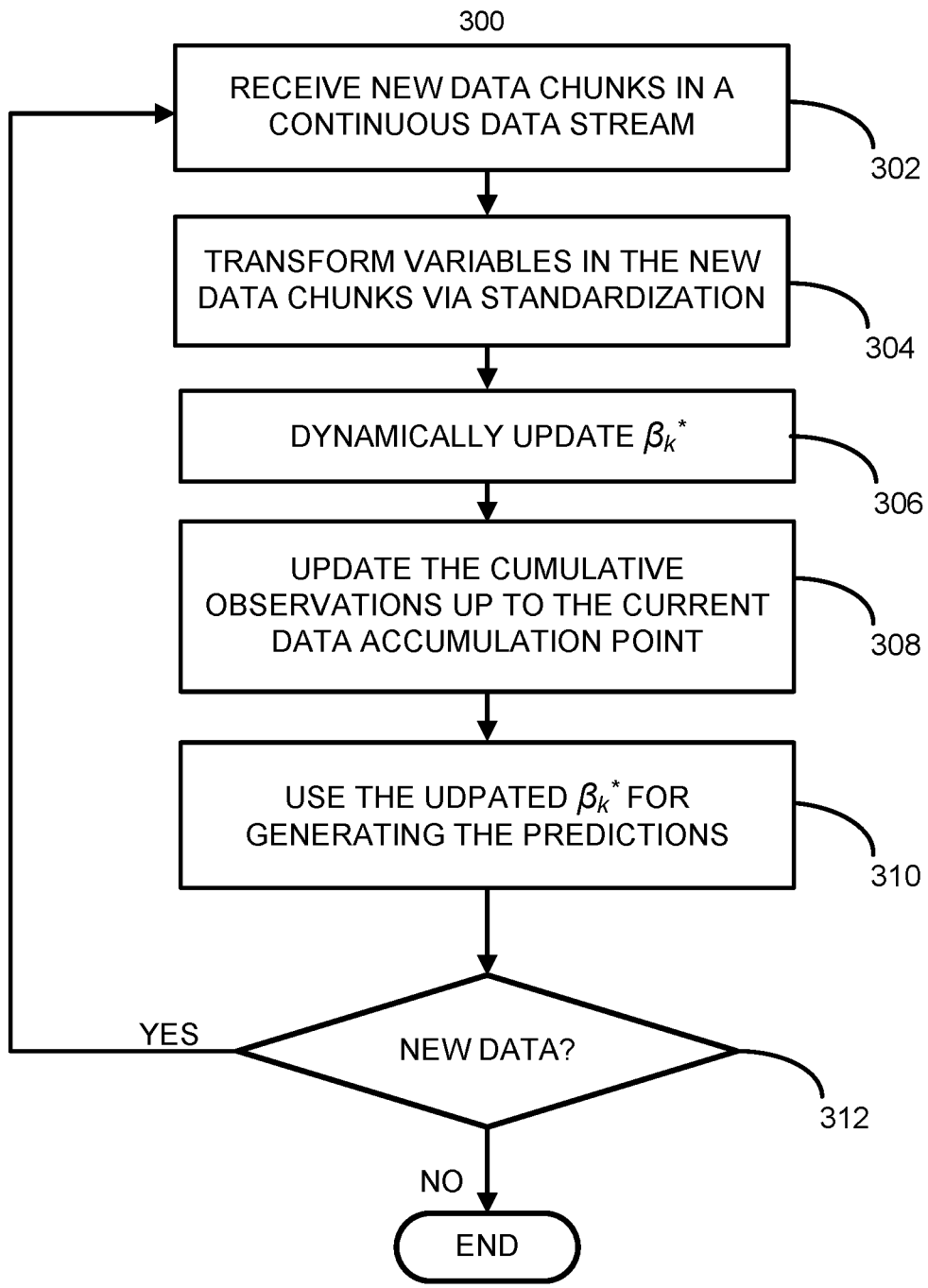
FIG. 3 is a flowchart of a method of updating a ridge regression data model of a data stream in response to receiving new observations, according to an example of the present disclosure.

FIG. 3 is a flowchart 300 that details one example of a method of updating a ridge regression data model of a data stream in response to receiving new observations. The method begins at 302 wherein new chunks of the data stream are received. For example, a chunk of new data in the data stream may be a plurality of new observations received within the data stream in a given time period, for example, between two data accumulation points. At 304, the new data values received in the time period between the two data accumulation points are standardized. At 306, the ridge estimator for the standardized data $\beta_k^*$ is obtained. The cumulative observations $\tilde{V}_k$ up to the current data accumulation point k are updated at 308 and may be stored, for example, in the non-transitory data storage medium 180 or another non-transitory data storage medium (not shown) remote from the computing apparatus 100. At 310, the data model associated with the updated ridge regression estimator for the standardized data $\tilde{V}_k$ is used for generating the predictions which can be used to improve the working of a real-world system that generates the data stream. By the way of illustration and not limitation, values indicative of projections for power consumption shown to a user on a user interface can be adjusted dynamically in response to updating $\beta_K^*$. At 312, it is determined if further data is being streamed to the computing apparatus 100. If yes, the method returns to 302 to receive and process the new data as detailed herein. Else the method terminates on the end block.

Figure 4:
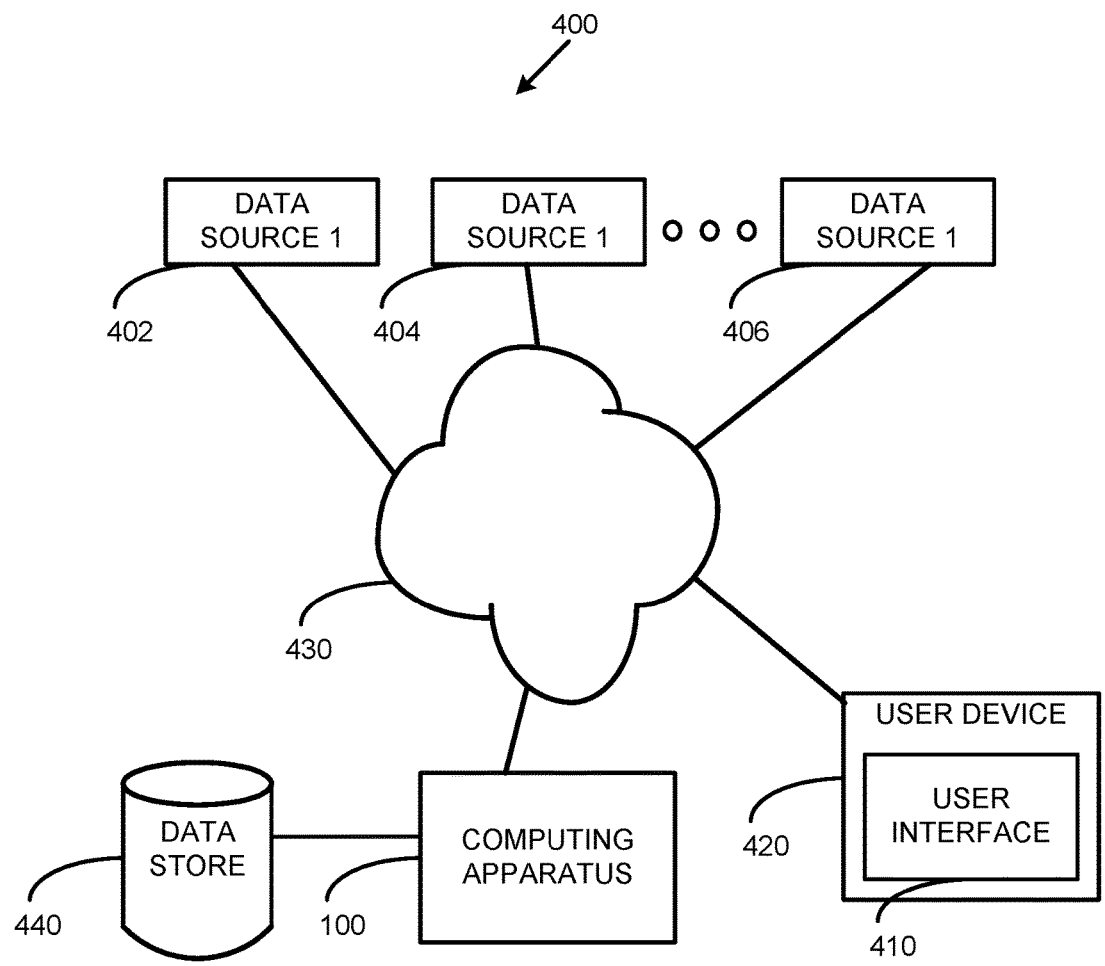
FIG. 4 is a block diagram of a network system according to an example of the present disclosure.

FIG. 4 is a block diagram of a network system 400 according to an example of the present disclosure. The network system 100 includes a plurality of data sources data source 1 402, data source 2 404 . . . data source n 406 each producing a respective data stream. The plurality of data sources may be hardware such as but not limited to computing apparatuses like servers, industrial controllers, machinery, monitoring instruments, and user devices such as desktops, laptops, tablet devices, smartphones, wearables and the like. It may be noted that the data streams from the plurality of data source 402, 404, 406 belong to the same underlying distribution. The data streams from the plurality of data sources 402, 404, 406 are transmitted to the computing apparatus 100 via a communication network 430. The communication network may be a LAN, WAN, WLAN, the internet and the like. The computing apparatus 100 that receives the data streams, analyses them to generate a data model 110. In addition, the computing apparatus 100 regularly updates the model 110 online in real-time even as new data streams are received. A data store 440 may be coupled to the computing apparatus 100 in order to store the data streams and/or the model 110 as they are being analyzed for updating the model 110. In an example, the data store 440 may be remote from the computing apparatus 100 and may be connected to the computing apparatus 100 via the network 430. Upon updating the model 110, the computing apparatus 100 further generates predictions based on the updated model 110. The predictions may enable updating values displayed on a user interface 410 of a user device 420.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An apparatus comprising:
   a processor;
   a non-transitory data storage medium comprising processor-readable instructions that when executed cause the processor to:
   receive a data stream from a data source, the data stream comprising data values corresponding to a series of data accumulation points;
   determine, for a subset of the data accumulation points, values of parameters including an optimal shrinkage parameter of a ridge regression data model representing the data stream wherein the subset of data accumulation points includes a penultimate data accumulation point;
   cache data values received subsequent to the penultimate data accumulation point;
   estimate values of the parameters for a current data accumulation point immediately following the subset of data accumulation points based on stored values of the parameters and the cached data values;
   update the data model with the values of the parameters for the current data accumulation point; and
   provide, via a user interface, predictions regarding the data stream, the predictions based on the updated data model.

2. The apparatus of claim 1, wherein the data stream is received from a population having the same distribution.

3. The apparatus of claim 1, wherein to determine the values of the parameters the processor is to:
   generate standardized data by standardizing the data values received in the data stream.

4. The apparatus of claim 3, wherein to determine the values of the parameters, the processor is to:
   calculate a value of a ridge estimator for the standardized data.

5. The apparatus of claim 1, wherein the current data accumulation point is a consecutive data accumulation point that is subsequent to the penultimate data accumulation point.

6. The apparatus of claim 5, wherein to cache the data values received subsequent to the penultimate data accumulation point, the processor is to:

cache the data values received during a time interval subsequent to the penultimate data accumulation point and preceding the current data accumulation point.

7. The apparatus of claim 1, the processor is to further:
determine if further data chunks comprising new data values are to be received in the data stream.

8. The apparatus of claim 7, the processor is to further:
repeat the steps of caching the data values, estimating values of the parameters for the current data accumulation point, updating the data model and providing the predictions based on the updated data model for each new data chunk received in the data stream.

9. The apparatus of claim 1, wherein to provide predictions regarding the data stream, the processor is to:
update information provided to a user on the user interface, the information based on the updated data model.

10. A computer-implemented method comprising:
receiving a data stream from a data source, the data stream comprising data values corresponding to a series of data accumulation points;
determining, for a subset of the data accumulation points, values of parameters including an optimal shrinkage parameter of a ridge regression data model representing the data stream wherein the subset of data accumulation points includes a penultimate data accumulation point;
caching data values received subsequent to the penultimate data accumulation point;
estimating values of the parameters for a current data accumulation point immediately following the subset of data accumulation points based on stored values of the parameters and the cached data values;
updating the data model with the values of the parameters for the current data accumulation point; and
providing, via a user interface, predictions regarding the data stream, the predictions based on the updated data model.

11. The method of claim 10, wherein the data stream is received from a population having the same distribution.

12. The method of claim 10, wherein the determining of the values includes generating standardized data by standardizing the data values received in the data stream.

13. The method of claim 12, wherein the determining of the values of the parameters includes calculating a value of a ridge estimator for the standardized data.

14. The method of claim 13, wherein the current data accumulation point is a consecutive data accumulation point that is subsequent to the penultimate data accumulation point.

15. The method of claim 14, wherein to cache the data values received subsequent to the penultimate data accumulation point, the method further comprises:
caching the data values received during a time interval subsequent to the penultimate data accumulation point and preceding the current data accumulation point.

16. The method of claim 10, further comprising:
determining if further data chunks comprising new data values are to be received in the data stream.

17. The method of claim 16, further comprising:
repeating the steps of caching the data values, estimating values of the parameters for the current data accumulation point, updating the data model and providing the predictions based on the updated data model for each new data chunk received in the data stream.

18. The method of claim 10, wherein to provide predictions regarding the data stream, the method further comprises:
updating information provided to a user on the user interface, the information based on the updated data model.

* * * * *